(12) United States Patent
Rensel et al.

(10) Patent No.: US 7,832,263 B2
(45) Date of Patent: Nov. 16, 2010

(54) TIRE HAVING WIRELESS MICRO AND NANO SENSORS

(75) Inventors: John D. Rensel, Tallmadge, OH (US);
Paul B. Wilson, Tallmadge, OH (US);
Francis L. Merat, University Heights, OH (US)

(73) Assignee: Bridgestone Americas Tire Operations, LLC

( * ) Notice: Subject to any disclaimer, the term of this patent is extended or adjusted under 35 U.S.C. 154(b) by 0 days.

(21) Appl. No.: 12/501,638

(22) Filed: Jul. 13, 2009

(65) Prior Publication Data

US 2009/0277262 A1 Nov. 12, 2009

Related U.S. Application Data

(62) Division of application No. 11/739,847, filed on Apr. 25, 2007, now Pat. No. 7,581,439.

(60) Provisional application No. 60/794,605, filed on Apr. 25, 2006.

(51) Int. Cl.
*G01M 17/02* (2006.01)
(52) U.S. Cl. ....................................... 73/146
(58) Field of Classification Search ................... None
See application file for complete search history.

(56) References Cited

U.S. PATENT DOCUMENTS

| 4,773,463 | A | * | 9/1988 | Okuni et al. | 152/546 |
| 6,626,035 | B1 | * | 9/2003 | Dent et al. | 73/146.2 |
| 7,129,828 | B2 | * | 10/2006 | Cook | 340/447 |
| 2003/0046992 | A1 | | 3/2003 | Caretta | |
| 2003/0201044 | A1 | | 10/2003 | Schick | |
| 2004/0216520 | A1 | | 11/2004 | Caretta | |
| 2005/0204806 | A1 | | 9/2005 | Brusarosco et al. | |

(Continued)

FOREIGN PATENT DOCUMENTS

DE 101 35 883 A1 5/2003

(Continued)

OTHER PUBLICATIONS

Wessel, R. "Nordic Researchers Aim for Multiprotocol Multisensor RFID Tag," RFID Journal, Jan. 19, 2007, (http://www.rfidjournal.com/article/articleview/2985).

(Continued)

*Primary Examiner*—Andre J Allen
(74) *Attorney, Agent, or Firm*—Thomas R. Kingsbury; Faysharpe, LLP

(57) ABSTRACT

A sensor system for obtaining data from an elastomeric article includes at least one wireless sensor. The sensor length-scales range from nano- to micro-scale devices that are small enough to avoid becoming occlusions within the article. The article may include sensors embedded within one of the materials of the article, a layer of sensors built into the article, and a string of sensors disposed within a component or embedded within a component of the article. The sensors may be configured to provide data related to one or more of temperature, pressure, sidewall flex, stress, strain and other parameters. The sensors may be LCD sensors, and/or conductive polymer sensors, and/or bio-polymer sensors and/or polymer diodes suitable for sensing data during the operation of the tire. A power circuit using energy generated by the tire may provide power to the sensors.

19 Claims, 3 Drawing Sheets

U.S. PATENT DOCUMENTS

| | | |
|---|---|---|
| 2005/0234613 A1 | 10/2005 | Brusarosco et al. |
| 2006/0017553 A1* | 1/2006 | Cook .................. 340/447 |
| 2007/0028679 A1 | 2/2007 | Stoila et al. |
| 2007/0029027 A1 | 2/2007 | Stoila et al. |
| 2007/0131035 A1 | 6/2007 | Krutz et al. |
| 2007/0251619 A1 | 11/2007 | Bertrand |
| 2007/0295069 A1 | 12/2007 | Mancosu et al. |

FOREIGN PATENT DOCUMENTS

| | | |
|---|---|---|
| EP | 1 431 741 A2 | 6/2004 |
| EP | 1 522 425 A1 | 4/2005 |
| EP | 1 526 366 A1 | 4/2005 |
| WO | WO 03/095245 A1 | 11/2003 |
| WO | WO 03/105511 A1 | 12/2003 |
| WO | WO 2006/098840 A2 | 9/2006 |

OTHER PUBLICATIONS

"Siemens aims to reinvent auto wheel (really)" Designfax Online, at least Jan. 4, 2007, Nelson Publishing, Inc.

IST Project Fact Sheet: "Intelligent tyre for accident free traffic (APOLLO),"Information Society Technologies, date of publication unknown, project start date Mar. 1, 2002.

Intelligent Tyre Systems—State of the Art and Potential Technologies: Intelligent tyre for accident free traffic, information Society Technologies, May 22, 2005.

International Search Report, Feb. 1, 2008.

Article: "FRICTION: On-board Measurement of Friction . . . to Enhance the Performance of Integrated Cooperative Safety Systems," Information Society Technologies, May 2006 (http://www.esafetysupport.org/download/related_projects/friction.pdf).

* cited by examiner

US 7,832,263 B2

TIRE HAVING WIRELESS MICRO AND NANO SENSORS

CROSS REFERENCE TO RELATED APPLICATION

This application is a divisional application of application U.S. Ser. No. 11/739,847, filed Apr. 25, 2007 now U.S. Pat. No. 7,581,439, which claims the benefit of U.S. Provisional Patent Application Ser. No. 60/794,605 filed Apr. 25, 2006; the disclosures of each are hereby totally incorporated by reference herein.

BACKGROUND

Technical Field

The present exemplary embodiment relates to tires having integrated sensor systems. It finds particular application in conjunction with monitoring physical and engineering properties of the tire with embedded sensors, and will be described with particular reference to vehicle tires. However, it is to be appreciated that the present exemplary embodiment is also amenable to other like applications including monitoring parameters for other elastomeric articles such as elastomeric articles capable of performing work.

BRIEF DESCRIPTION

Background Information

Elastomeric articles such as air springs and vehicle tires are often subjected to a wide range of internal and external forces during use. The result of the work performed by the viscoelastic materials can be indicated by temperature, a thermodynamic quantity, as a measure of the useful work lost to heat. Tires are designed to withstand repeated internal and external forces and the resulting temperatures within an operational window at various loads and internal pressures. When an elastomeric article experiences conditions beyond this operational window, the performance of the article can be shortened. For example, in some situations, a vehicle tire that is being improperly used may include components that are subjected to excessive shear forces during use e.g., repeated cyclic deformation. These internal forces generate heat that will raise the internal temperature of the tire. Overheated tire components may eventually break down and alter the tire performance. Tires that are not adequately inflated to the pressures required for their operating conditions may also overheat and may ultimately suffer heat-related wear that may reduce their operational lifespan. In certain instances where the vehicle is engaged in performing a work task such as hauling coal in a mining operation or transferring cargo on public highways, the impact of reduced tire lifespan can negatively affect the work task causing loss of productivity and increased operational costs.

Today's vehicles also include actively-managed suspension and braking systems. These systems infer or assume data about the relationship between the tire and the road surface. Vehicle manufacturers desire a system to obtain measurable real-time engineering data from the tire so that this data may be used to actively manage the vehicle's operation.

It is therefore desirable to sense parameters experienced by the tires and by the tire components such as forces including stresses and strains, temperatures, vibrations, and other conditions to provide useful information concerning the status of the tire and its components.

SUMMARY OF THE INVENTION

The invention provides a sensor system for obtaining data from an elastomeric article from a sensor disposed within or connected to the article. The sensor system obtains the data through wireless communications. The sensors are micro-scale or nano-scale sensors that are sufficiently small to be embedded within the article. Such sensors may be configured in combination with the elastomeric material to be sufficiently small to avoid being an occlusion in the elastomeric material.

In one configuration, the invention provides an elastomeric article having at least one or a plurality of sensors embedded within the article. The sensor or sensors are micro-scale or nano-scale in size. At least a plurality of sensors are configured to provide a wireless signal to a reader to provide physical property data or engineering condition data of the article. One configuration provides the plurality of sensors embedded throughout the materials of the article components. Another configuration provides the sensors in a sensor layer that is built into the article. A further configuration uses a string-shaped plurality of sensors embedded within the material of the article.

In another configuration, the invention provides a tire having a plurality of sensors embedded within the tire. The tire may be a solid tire, a pneumatic tire, or an airless tire. The sensors are micro-scale and nano-scale in size. At least a plurality of sensors are configured to provide a wireless signal to a reader to provide physical property data or engineering condition data of the tire. One configuration provides the plurality of sensors embedded throughout the materials of the tire components. Another configuration provides the sensors in a sensor layer that is built into the tire. A further configuration uses a string-shaped plurality of sensors embedded within or provided as part of a tire component.

In a further configuration, the invention provides an elastomeric article having a plurality of sensors configured to change their configuration upon reaching a threshold. In one embodiment, the threshold is temperature-based. Other thresholds include stress, strain, and vibration. The reader is programmed to look for changes in the change in the sensor configuration. Exemplary changes in sensor configuration include that the sensor activates, deactivates, changes transmission frequency, or alters the time between transmissions. An exemplary embodiment of the article is a tire and, more particularly, a pneumatic tire.

A further configuration of the invention provides a power circuit that generates power for a sensor from the energy generated by the elastomeric article itself.

BRIEF DESCRIPTION OF THE DRAWINGS

Similar numbers refer to similar parts through the specification. The drawings are intended to be schematic or pictorial representations. The drawings are not to scale and the cross hatching selected for the drawings is not intended to limit the materials.

DETAILED DESCRIPTION

Figure 1:
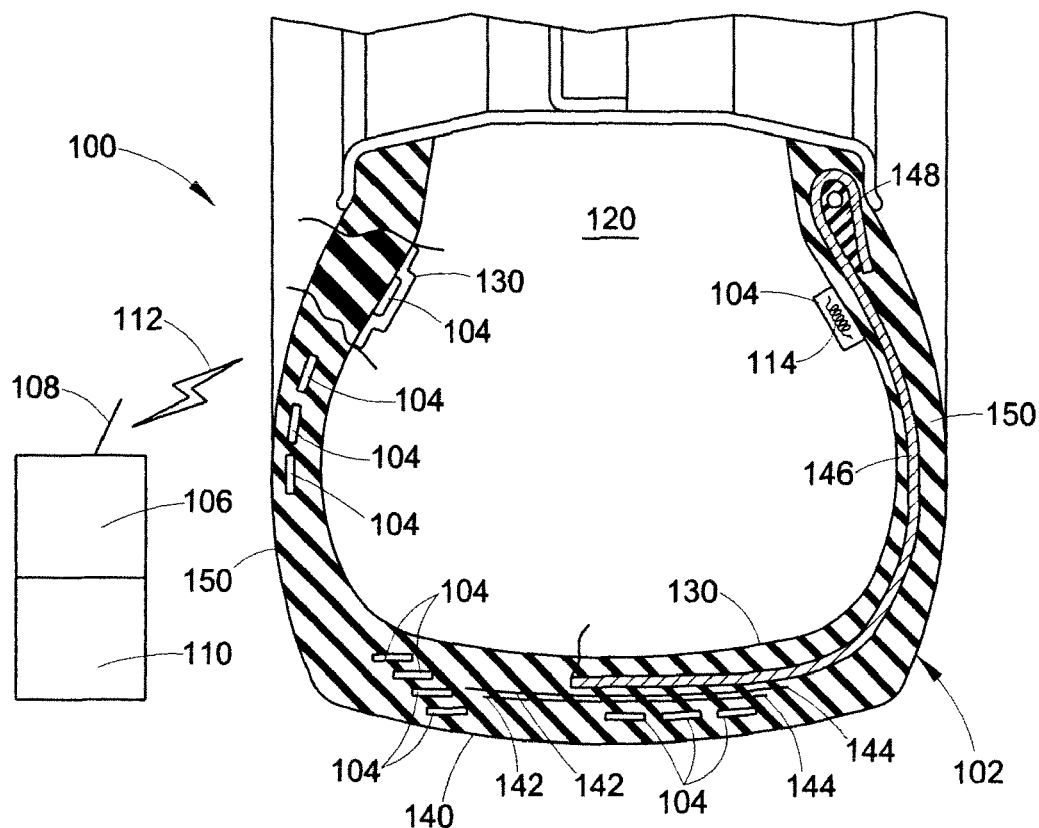
FIG. 1 is pictorial block diagram illustrating a monitoring system in accordance with the invention.

With reference to FIG. 1, a remote sensing system for a tire 102 is shown generally at 100. The sensing system 100 includes one or more wireless sensors 104 attached to and/or embedded in the tire 102 for sensing various parameters including but not limited to temperature, pressure, air pressure, stress, strain, vibration, and chemistry, among others. The sensing system 100 obtains data useful for monitoring tire properties or characteristics including, but not limited to, tire tread wear, tire pressure, tire temperature, and sidewall flex. Non-uniformities in the tire 102 can also be monitored and/or discovered such as bulges, punctures, broken threads or cords. Other irregularities can be determined in this manner such as vehicle suspension anomalies due to irregular tread wear or footprint changes.

Though the examples described herein are in reference to pneumatic vehicle tires, it should be appreciated that other tires—such as airless and solid tires—and other elastomeric articles, including air springs, conveyor belts, roofing materials, sporting goods, etc. may also be monitored using a sensing system of similar construction and implementation.

The wireless sensors 104 provide sensed data to a data collection device 106, also known as a reader or data acquisition circuit, which is located remotely from the sensors. The data collection device 106 can be mounted in or on the tire 102, in or on the vehicle, or remote from both such as in a test stand installation. The wireless sensors 104 provide data in the form of electromagnetic sensor signals that can be read by the data collection device 106 in a wireless manner thereby avoiding the need for a physical connection between them. The wireless communication between sensor 104 and collection device 106, shown at 112, provides a great degree of versatility in mounting the sensor to the tire or embedding the sensor within the tire.

The data collection device 106 can include an antenna 108 for receiving the sensed data in the form of electromagnetic radiation, such as, for example, radio wave transmissions as shall be described in further detail below. A single collection device 106, or a plurality of collection devices, can be used to collect the data sensed by the wireless sensors 104. A relay mechanism also may be used wherein the relay mechanism gathers data from the article and relays the data to a collection device 106. A plurality of relays may be used. In one configuration, a relay may be disposed in the wheel or near the wheel while the collection device is carried by the vehicle or disposed at a fixed location.

A data processor 110 can be connected to the data collection device 106 for processing the sensed data in order to synthesize information about the tire properties being monitored. The data processor 110 can be a computing device including but not limited to a dedicated processor, a conventional computer such as a personal computer or laptop, or other known electronic devices for collecting and processing signals obtained from wireless sensors. The one or more collection devices 106 can be disposed apart from one or more central processing devices 110 or integrated therewith.

The data collection device 106 and data processor 110 can be disposed on or in the vehicle for providing sensed data and processed determinations about the tire or vehicle in real time, if so desired. Alternatively, a test stand including these devices 106 and 110 can be configured to provide this data during tire testing.

Sensors 104 may be non-silicon based, such as LCD sensors, Conductive Polymer sensors, or Bio-polymer sensors. Sensors 104 also may be polymer diodes having the advantage of providing data at low frequencies. Low frequencies enable the sensor outputs to travel through thicker mediums and as such these types of sensors can be embedded throughout a greater range of the tire material, such as being embedded deeper within the tire, while still providing usable data which can be detected remotely. The wireless sensors 104 also may be Radio Frequency IDentification (RFID) devices providing their sensed data to the one or more suitable collection devices. Such RFID devices are fabricated in small enough sizes to be incorporated in large numbers into a tire 102. Large numbers of RFID devices may thus be incorporated into the tire body to provide feedback from a wide area of the tire.

When sensors 104 are embedded with a material or a component, each sensor 104 is sufficiently small to avoid being an occlusion at the embedded location. An occlusion is a foreign material embedded in an elastomer that does not have similar physical properties as the surrounding elastomer. An occlusion leads to undesirable performance of the elastomer. Sensors 104 may be on the micro- and nano-scale to avoid being occlusions depending on the properties of the sensor and the properties of the material surrounding the sensor. In one example, each sensor is no larger than 20 microns. Depending on where the sensors are disposed, other sizes of individual sensors can range from tens to hundreds of square millimeters in size down to smaller sizes similar to that of carbon black to down to even smaller sizes in microscopic range.

Figure 1A:
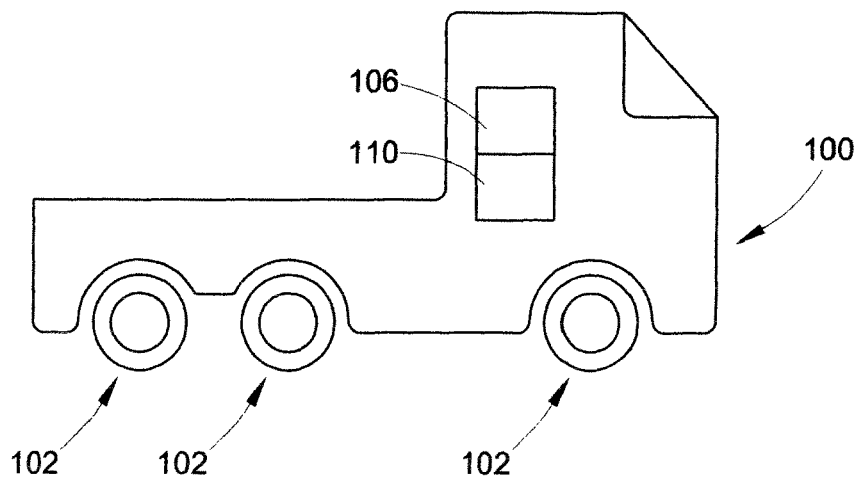
FIG. 1A is a view of a vehicle having an active suspension system incorporating the monitoring system of the invention to provide data to the suspension system.

Wireless sensors 104 may include functions beyond "identification" or "acknowledgement" of the sensor 104 as is commonly known with RFID tags. The wireless sensors 104 may also sample and/or measure parameters such as temperature, pressure, air pressure, stress, strain, vibration, and chemistry, among others. This data may be used by data collection device 106 and data processor 110 to generate information about the tire body. When data is obtained in real time, the generated information may be used as part of a feed back loop with the controller for the vehicle's suspension. FIG. 1A depicts a vehicle having an active suspension. The suspension controls receive information or data from reader 106 or processor 110 and uses this information as part of the control calculations for the suspension. This data and information may be stored over time to create a tire history. The tire history information may be used to modify the design of future tires.

The wireless sensors 104 can be passive sensors which do not include a power source and active transmitter. The passive sensors 104 can be inductively coupled with the data collection device. The sensors 104 include one or more conductive elements 114 forming one or more antennas which receive electromagnetic waves emitted from the collection device antenna 108. This radiation is converted into electricity that can power the electronic devices forming the sensors enabling the sensors to sense the requisite data and transmit it back to the collection device 106.

The passive sensors 104 can also be coupled with the data collection device 106 by backscatter coupling which uses the power reflected from the sensor that is radiated into free space. A small proportion of this power is picked up by the collection device's antenna 108 traveling in the "backwards direction" from the sensor 104 and can be decoupled using a directional coupler and transferred to the receiving input portion of the data collection device.

The sensors 104 can also be powered by other sources of energy including those generated by the tire itself. The system can include a power circuit using energy scavenged from the energy generated by the tire, its mounting assembly, or other related parts, into electrical energy for providing power to the one or more sensors. For example piezo-electrical circuits, or other known energy scavenging circuits available from Siemens Technology or Seiko, such as the Kinetic Power Source, which convert energy from the flexing sidewall into electrical energy, can be used to power the sensor. Other energy scavenging or harvesting devices are disclosed in patent publications assigned to EnOcean GmbH. This electrical energy can also power a transmitter circuit included with the sensor 104 that is used for sending the sensed data acquired by the sensor back to the data collection device 106.

This system 100 can use a carrier frequency determined by the collection device 106. Different carrier frequencies can be used to provide distinction among sensors 104, or different classes of sensors, so that each can provide data simultaneously. Similarly, various known modulation techniques can also be used to enable such simultaneous data collection. The wireless sensors 104 can also be active sensors including integrated power sources.

The bandwidth used for transmitting the sensed information to the collection device 106 can be low frequencies such as in the kilohertz to hundreds of kilohertz, high frequencies in the megahertz range, ultra-high frequencies in the hundreds of megahertz, and microwave frequencies in the gigahertz range. Ultra wide band communication techniques may be used to transmit data from sensors 104 to reader 106.

Figure 4:
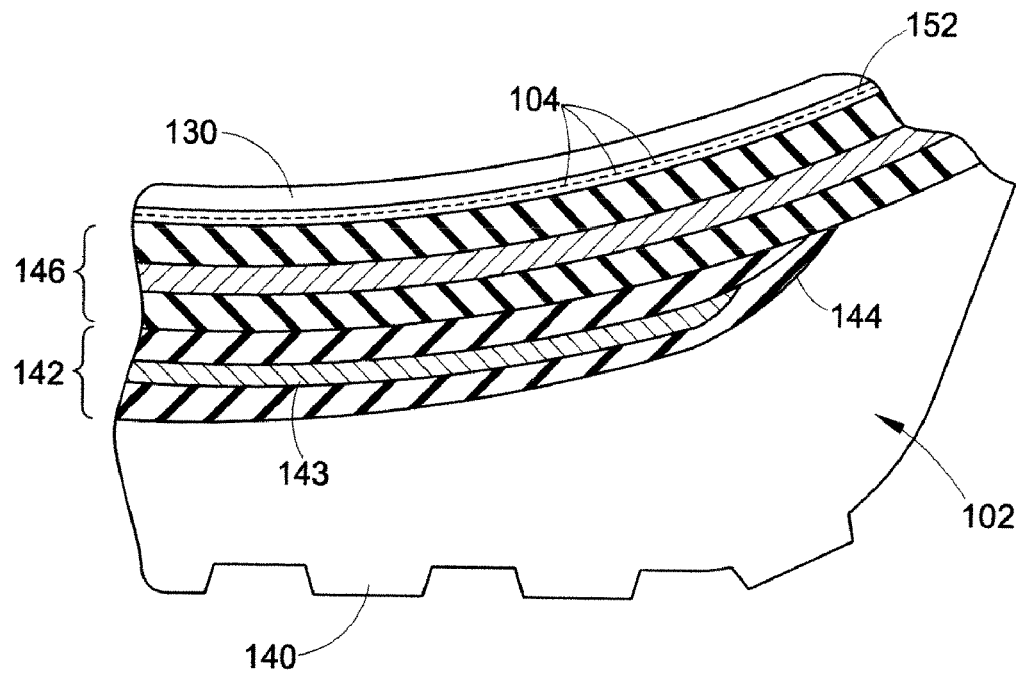
FIG. 4 is an enlarged section view of a portion of a tire having a sensor layer disposed intermediate to the innerliner and the body ply.
Figure 5:
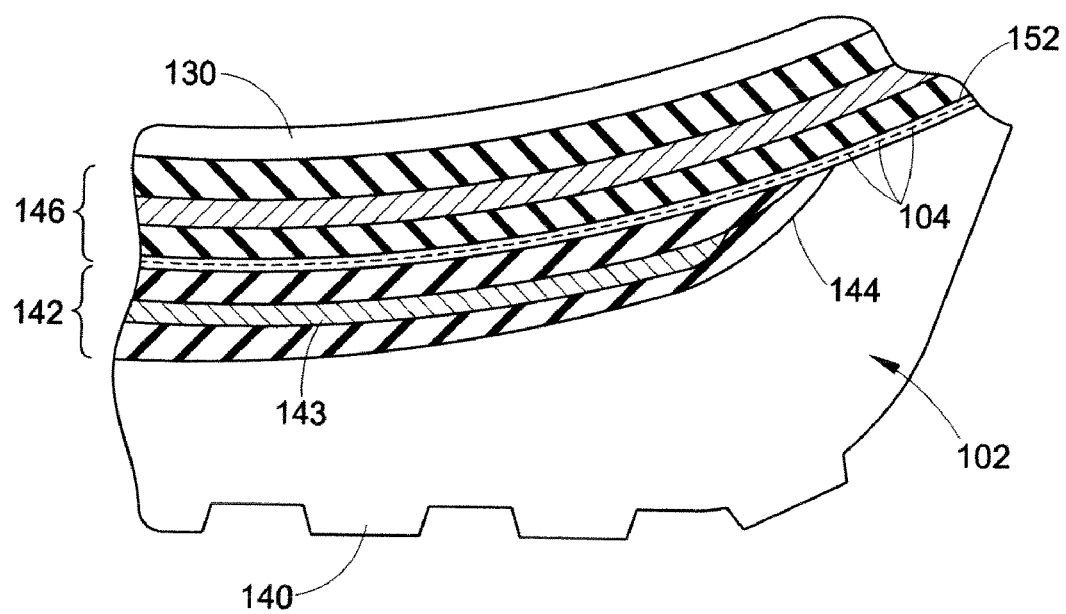
FIG. 5 is an enlarged section view of a portion of a tire having a sensor layer disposed intermediate to the body ply and the belt package.

Sensors 104 can be used to monitor the physical structure of the tire by using a plurality of sensors distributed throughout the tire, throughout a component of the tire, or adjacent a specific location of the tire. Sensors 104 may also be carried by a sensor layer in a purposefully-arranged or random manner. These sensors may form an array or a sensor mesh. The sensor array can be a two dimensional array (1 sensor thick having a width and length) or a three dimensional array (multiple sensors thick having a length and width). The meshes or arrays may have a curved configuration to match a tire component. The sensor layer may be formed by printing techniques using conductive inks on an elastomeric or a plastic substrate that may be incorporated into the tire during the tire build process. An entire circuit of independent or related sensors may be printed on such a substrate. In addition, conductive polymers may be employed for creating these circuits, or for antenna structures or sensing elements within the tire. Examples of sensors layers are depicted in FIGS. 4 and 5. The layer may be continuous or a combination of separated patches. The layer may define a plurality of openings that allows adjacent materials to touch each other through the layer. Either surface of the layer may be textured or have a contour. Placing the sensors in radial or circumferential band-shaped layers around the tire may be desirable. Radial U-shaped sections may be useful for monitoring the tire sidewall. Band-shaped layers may be disposed adjacent to areas of the tire that are desirable to monitor—such as the belt edges 144.

By sampling the wireless sensors repeatedly, to obtain the relative strength of the sensed signal emanating from each sensor, a map may be created of the tire structure. This map may be compared to an initial map of the tire generated and stored when the tire is placed into service. The initial map may be stored with reference to a unique tire identification number disposed on a RFID chip in the tire or stored with the sensors. Changes in the signal strength or data from one or more of the areas of the map may indicate changes in particular locations of the tire. These changes can include temperature changes, strain changes, and pressure changes either within the tire chamber 120 or within the structure of the tire itself, such as in the tread, in the sidewall, in the bead, in the turn-up area, or near the cap. These changes can be used to indicate changes in the performance of different components. When used with an active suspension system, the changes are used to alter the suspension setup.

Figure 3:
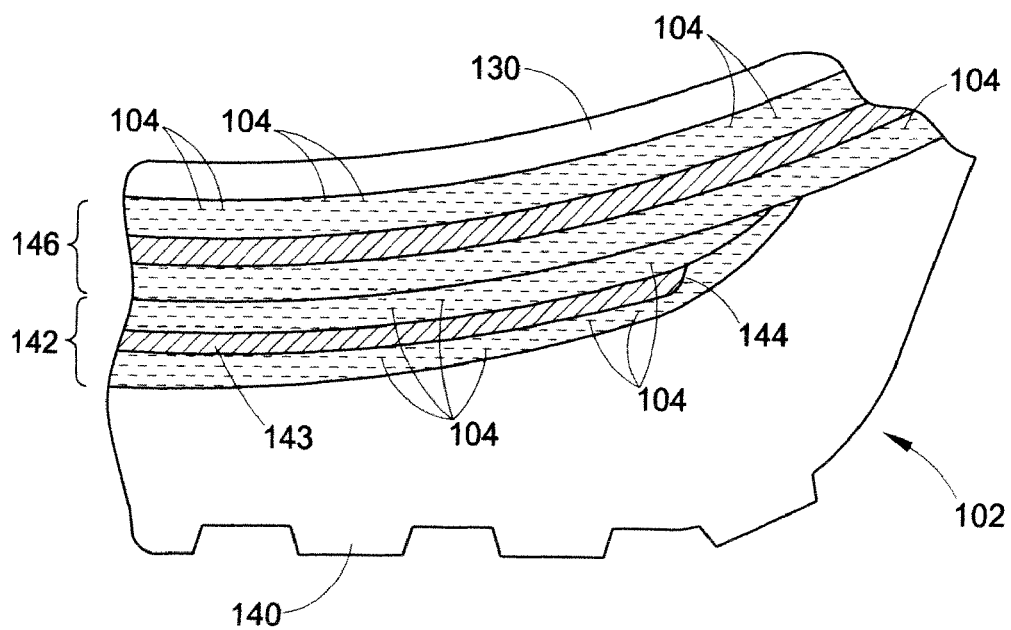
FIG. 3 is an enlarged section view of a portion of a tire having a plurality of sensors embedded in exemplary tire component materials.

When embedded with the materials of the tire components, the sensors may be added to the materials during the manufacturing process of the components. In one embodiment, the sensors are added to the materials during the last step of mixing prior to component formation. These sensors then become randomly distributed throughout the material that comprises the tire component as shown in FIG. 3. The sensor-laden materials are then used to build the components of the tire. Some percentage of the sensors may become nonfunctional during these steps but enough others should remain operational to provide data.

FIG. 3 depicts two exemplary configurations where a plurality of sensors 10 are embedded in the material of the body cord ply 146 and the material of the reinforcing cord ply 142. Sensors 104 also may be carried by or integrally formed in or printed on a layer 152 that may be sandwiched between two or more tire components as shown in FIGS. 4 and 5. Layers 152 are flexible material layers that carry a plurality of sensors 104. Layer 152 may be continuous from bead to bead or may be disposed in selected areas of tire 102 (such as only between belts 142 and ply 146). The size and location of layer 152 is selected based on the engineering condition of the tire being monitored. Layer 152 may be continuous about the circumference of tire 102 of may be applied in patches. Layer 152 may also define a plurality of openings (a mesh) so that the materials of adjacent tire components may directly contact each other through the openings for direct connections—such as direct bonding during the tire curve step. In another embodiment, the material of the layer 152 includes uncured (or green) material or materials that also bond with the adjacent tire components.

Figure 2:
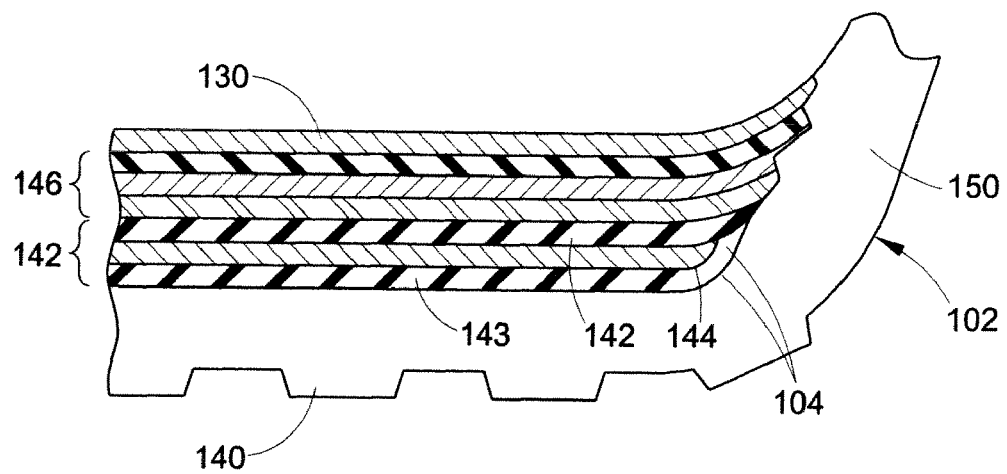
FIG. 2 is an enlarged section view of a portion of a tire having a plurality of sensors disposed at the belt ends.

Various regions of tire 102 can be monitored by the sensors 104, such as the tread 140, the reinforcing belt 142 (belt 142 typically includes oppositely biased plies of cords that are pictorially depicted as layer 143 in these drawings), the belt ends 144, the body cord ply 146, the bead area 148, the innerliner 130, and the sidewall 150, among others. For example, stress and strain sensors 104 can be used to monitor the tire sidewalls 150 or the body cord ply 146. In another example depicted in FIG. 2, temperature sensors 104 may be used to monitor the ends 144 of the reinforcing belts 142. In FIG. 2, sensors 104 may be disposed in a ring-shaped layer or a ring-shaped thread disposed adjacent to the ends 144. In FIG. 2, sensors 104 may also be embedded within the ends of layer 142. When sensors 104 are disposed in sidewall 150, the work and/or energy created in the sidewall 150 can be monitored in this manner to record an operating history of the tire 102. The data processing device 110 can use this data to determine if these sensed parameters have exceeded the preferred operating conditions of the tire and provide such an indication to an operator. The preferred operating conditions may be determined by running a similar tire on controlled test equipment to establish acceptable ranges of data from the sensors 104. These acceptable ranges may be used by the data processing device to monitor tire conditions.

The bead ring and apex filler of the tire tend to interfere with the radio transmission from the monitoring device and thus it is desired to position the antennas 108 and 114 away from the bead ring and apex filler so that the transmission through the tire sidewall is as strong as possible.

Since tire 102 is not only subjected to rotational forces when the vehicle is moving but are also subjected to various impact forces when the tire contacts bumps or surface irregularities, sensors mounted to the tire should be attached in a manner that is strong enough and secure enough to maintain the position of the sensor with respect to the tire while experiencing all of these forces. One method of anchoring the sensor to the tire can include curing it within the body of the tire. For instance, the sensor may be cured within an innerliner of the tire, a portion of which is shown at 130. Sensors 104 may be dispersed throughout the material of the innerliner, the material encasing the body cord ply, the material encasing the reinforcing cords, the sidewall materials, or the bead filler. Two of these examples are depicted in FIG. 3.

The sensors 104 can also provide a simple acknowledgement signal that can be detected so as to indicate that the sensor is still in or on the tire. For example, a predetermined number of sensors 104 are distributed evenly throughout the useful tread thickness. In this example, a large number of sensors are used, such as, for example, 10,000 small sensors distributed evenly throughout the tread thickness. The sensors in this example are all similar, each providing a separate signal to the signal collection device 106. The signal collection device 106 can be used to count the number of separate but similar signals it receives, thereby determining the number of sensors still embedded within the tire which can be used to determine the amount of wear the tread has experienced. Further, the number of sensors remaining in the tread can be localized to specific portions or regions of the tread by counting the sensors in those portions/regions. In this manner, tread wear can be determined.

In the following configuration, the tires may have a single sensor although the configurations will provide more comprehensive results when a plurality of sensors are used in a sensor layer next to or within a tire component or are embedded in a tire component.

In one exemplary configuration, a tire includes sensors 104 that are configured to become active or deactivate at a threshold temperature. An exemplary threshold temperature may be 100 degrees Celsius. The threshold temperature is designed to correspond to an undesirable temperature or a temperature that is somewhat below an undesirable temperature in the area of the tire 102 where these particular sensors 104 are located. The particular temperature depends on the tire design and tire components. When the system is configured in this manner, if the reader suddenly loses (in the case of deactivation) or gains (in the case of activation) a percentage of the acknowledgement signals from these sensors 104, then this will indicate the threshold temperature has been reached at a location in the tire 102 having the sensors 104. When sensors 104 are disposed in a layer adjacent a tire component, then the system will indicate the threshold temperature has been reached by at least one area of that component. The software may then create an appropriate indication (either to the user of the vehicle, the owner of the vehicle, the maintenance shop, or the manufacturer of the tire via network communications). One example is to locate a plurality of sensors adjacent to the reinforcing belt ends. These sensors would be configured to stop providing a signal (or an acknowledgement) at a threshold temperature somewhat below a temperature that is experienced during tire damage. If the threshold temperature is reached and the sensors stop delivering responses, then the user of the vehicle may be warned to have the tire replaced or to have the tire serviced.

In another configuration, the sensors may be configured to transmit one signal (either a readable signal or a lack of a signal) when subjected to vibrational levels within a defined acceptable range. If the sensors consistently experience vibration levels outside of this range, they transmit a different signal (a different readable signal such as one at a different frequency, they turn on, or they turn off) to indicate a change in the vibration levels inside the tire body.

In another configuration, the sensors 104 are adapted to transmit at one frequency (or range of frequencies) at a range of normal tire operating temperatures. When the temperature experienced by the sensors falls outside the range, the sensors transmit at a different frequency indicating the change of temperature in the tire body.

Sensors 104 also may be provided in the form of a thin elongated structure, or string-shaped structure, that may be incorporated into one of the cord plies or one or more of the body cords or one or more of the reinforcing cords. The string-shaped sensor structure may replace and act as one of the cords, may be disposed between the cords, or may be incorporated into one of the cord bundles (such within the wrapping cord). Such a string may include a plurality of sensors arranged end-to-end or sensors disposed in spaced configurations along a carrier structure. For example, a string-shaped sensor or plurality of sensors may be disposed bead-to-bead in the body cord ply with a relay device embedded in the bead filler. Sensed data would be transferred to the relay in order to be transmitted out of the tire. Another example located a circumferential ring-shaped plurality of sensors at the cords ends 144.

The exemplary embodiment(s) described herein have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A pneumatic tire comprising:
    a pair of bead rings;
    a body cord ply extending between the bead rings;
    an innerliner disposed inwardly of the body cord ply;
    a belt layer disposed outwardly of the body cord ply;
    a pair of sidewalls disposed outwardly of the body cord ply; and
    a sensor layer including a plurality of micro-scale sized or smaller sensors each providing wireless signal data related to one or more physical properties of the tire.

2. The tire of claim 1, wherein the sensor layer is embedded within the body cord ply or disposed adjacent the body cord ply between the body cord ply and the innerliner or is disposed adjacent the body cord ply between the body cord ply and the sidewalls or is disposed adjacent the body cord ply between the body cord ply and the belt layer or is disposed outwardly of the belt layer or is embedded within the innerliner.

3. The tire of claim 1, wherein the belt layer has a pair of ends, the sensor layer being disposed adjacent to one of the ends of the belt layer.

4. The tire of claim 1, wherein the sensors are sufficiently small to avoid being an occlusion in the tire.

5. The tire of claim 1, wherein the sensor layer includes sensors adapted to provide data about at least one physical property of the tire including temperature, stress, strain, shear, vibration, or chemistry.

6. The tire of claim 5 wherein the sensor layer includes stress and strain sensors disposed adjacent the body cord ply and the sidewalls.

7. The tire of claim 1, wherein the sensor layer has a circuit formed of conductive inks on an elastomeric or plastic substrate.

8. The tire of claim 1, wherein the plurality of sensors includes a large number of sensors each providing a wireless signal providing a physical property of the tire.

9. The tire of claim 1, wherein the sensor layer comprises a mesh of sensors having openings allowing tire materials adjacent the layer to extend through the layer.

10. The tire of claim 1, wherein the sensor layer comprises an array of sensors one sensor thick.

11. The tire of claim 1, wherein the sensor layer comprises an array of sensors multiple sensors thick.

12. The tire of claim 1, wherein the sensors are randomly distributed throughout the sensor layer.

13. A pneumatic tire comprising:
a pair of bead rings;
a body cord ply extending between the bead rings, the body cord ply having a plurality of body cords encased in a body cord ply material;
an innerliner disposed inwardly of the body cord ply;
a belt layer disposed outwardly of the body cord ply; the belt layer having a plurality of cords encased in a belt layer material;
a pair of sidewalls disposed outwardly of the body cord ply; the sidewalls being fabricated from a sidewall material; and
a plurality of micro-scale sized or smaller sensors providing wireless signals providing data related to at least one physical property of the tire, the sensors embedded in at least one of the body cord ply material, the belt layer material, and the sidewall material, each sensor having a size similar to carbon black or smaller thereby being sufficiently small enough to avoid being an occlusion.

14. The tire of claim 13, wherein the sensors are randomly distributed.

15. The tire of claim 13, wherein the embedded sensors are cured within the tire.

16. The tire of claim 13, wherein the sensors are one of an LCD sensor, a conductive polymer sensor, a bio-polymer sensor, and a polymer diode.

17. The tire of claim 13 having a tread including a useful tread thickness, wherein the plurality of sensors include a large number of sensors distributed throughout the useful tread thickness, each sensor providing a signal.

18. The tire of claim 17, further comprising a signal collection device sampling the sensors wireless signals for creating a map of the tire structure.

19. The tire of claim 18, wherein the signal collection device counts the sensors in different regions of the tread thereby localizing the sensors remaining in the tread for determining tread wear.

* * * * *